United States Patent
Nilsson et al.

(10) Patent No.: US 7,347,304 B2
(45) Date of Patent: Mar. 25, 2008

(54) SYSTEM FOR CONTROL OF BRAKE ACTUATOR

(75) Inventors: Peter Nilsson, Orkelljunga (SE); Ola Nockhammar, Trellborgsgatan (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/672,808

(22) Filed: Sep. 26, 2003

(65) Prior Publication Data

US 2005/0067233 A1 Mar. 31, 2005

(51) Int. Cl.
*B60L 7/00* (2006.01)
*F16D 66/00* (2006.01)

(52) U.S. Cl. .................. 188/158; 188/1.11 E; 188/72.1; 303/155; 701/70

(58) Field of Classification Search ........ 188/158–162, 188/1.11 E, 1.11 R, 72.2, 72.7–72.8, 72.1, 188/342, 72.6; 310/83; 303/20, 155, 3, 303/15, 152; 701/70, 71, 80, 90
See application file for complete search history.

(56) References Cited

U.S. PATENT DOCUMENTS

| | | | | |
|---|---|---|---|---|
| 4,327,414 A | * | 4/1982 | Klein | 701/79 |
| 4,653,614 A | | 3/1987 | Price et al. | 188/70 |
| 4,852,699 A | * | 8/1989 | Karnopp et al. | 188/72.2 |
| 4,946,007 A | | 8/1990 | Pederson et al. | 188/24.14 |
| 4,974,704 A | | 12/1990 | Miller et al. | 188/24.24 |
| 4,995,483 A | | 2/1991 | Moseley et al. | 188/162 |
| 5,012,901 A | | 5/1991 | Campbell et al. | 188/71.4 |
| 5,558,409 A | * | 9/1996 | Walenty et al. | 303/10 |
| 5,788,023 A | | 8/1998 | Schoner et al. | 188/72.7 |
| 5,829,557 A | | 11/1998 | Halasy-Wimmer et al. | 188/162 |
| 6,000,507 A | * | 12/1999 | Bohm et al. | 188/158 |
| 6,003,640 A | * | 12/1999 | Ralea | 188/71.5 |
| 6,209,689 B1 | * | 4/2001 | Bohm | 188/156 |
| 6,209,966 B1 | | 4/2001 | Mies | |
| 6,270,172 B1 | * | 8/2001 | Shirai et al. | 303/152 |
| 6,279,694 B1 | * | 8/2001 | Bohm et al. | 188/162 |
| 6,318,513 B1 | | 11/2001 | Dietrich et al. | 188/72.7 |
| 6,354,671 B1 | | 3/2002 | Feldmann et al. | 303/15 |
| 6,471,015 B1 | * | 10/2002 | Ralea et al. | 188/1.11 L |
| 6,481,805 B1 | * | 11/2002 | Ichinose et al. | 303/11 |
| 6,554,108 B1 | * | 4/2003 | Bohm | 188/1.11 E |
| 6,702,069 B2 | * | 3/2004 | Ralea et al. | 188/71.5 |
| 6,752,247 B2 | * | 6/2004 | Hartsock | 188/72.7 |
| 2003/0029680 A1 | * | 2/2003 | Ralea et al. | 188/71.5 |
| 2003/0062228 A1 | * | 4/2003 | Ichinose et al. | 188/72.3 |

(Continued)

FOREIGN PATENT DOCUMENTS

DE 10156348 C1 4/2003

(Continued)

*Primary Examiner*—Melody M. Burch
(74) *Attorney, Agent, or Firm*—St. Onge Steward Johnston & Reens LLC

(57) ABSTRACT

A vehicle brake system includes a brake actuator, a brake controller operative to control the brake actuator, and at least one position sensor which senses a current position of at least one moveable brake component and provides a current position signal indicative of the current position of the at least one moveable brake component to the brake controller. The brake controller is operative to cause actuation of the brake actuator based at least in part upon a position indicative command received by the brake controller indicative of a commanded position of the at least one moveable brake component and at least in part based upon the current position signal.

35 Claims, 6 Drawing Sheets

U.S. PATENT DOCUMENTS

2004/0108175 A1    6/2004    Schautt ..................... 188/72.7

FOREIGN PATENT DOCUMENTS

| EP | 1 279 854 A2 | 1/2003 |
|---|---|---|
| WO | WO 03/036121 A1 | 1/2003 |
| WO | WO 03071150 | 8/2003 |
| WO | WO 2005/030549 A3 * | 4/2005 |

* cited by examiner

SYSTEM FOR CONTROL OF BRAKE ACTUATOR

FIELD OF THE INVENTION

The present invention relates to a system for controlling the application of a brake of a vehicle, and is particularly well-suited for controlling the application of an electromechanical brake with self-energizing characteristics.

BACKGROUND OF THE INVENTION

Electromechanical brakes have been known for some time. U.S. Pat. No. 5,788,023 discloses a disc brake for a vehicle which can be actuated electrically and whose brake linings can be pressed against the brake disc with the aid of an electric motor. The electric motor transmits its actuation force, via a so-called planetary rolling-contact threaded spindle, onto an axially displaceably mounted piston which interacts with the brake lining.

U.S. Pat. No. 5,829,557 discloses another vehicle disc brake which can be actuated electrically and whose brake linings can in turn be pressed against the brake disc by means of an electric motor serving as an actuator. The electric motor comprises a spindle gear mechanism and, by means of a spindle element which can be of different designs, is connected, in the direction of displacement of the brake linings, to an axially displaceable piston which acts on a brake lining. In this patent, there is optional provision for the use of an additional gear mechanism for converting the torque and rotational speed.

A major problem with conventional brakes with an electric actuator is the high actuator force which has to be applied in order to achieve a sufficient braking effect. The necessary high actuator force and the resulting large power demand of the actuator make it necessary to employ very large drive units, usually electric motors, which have large torques, and are also heavy and expensive. The result of this is that electromechanical brakes have, to date, not become widespread as vehicle brakes, for example.

In order to decrease the energy consumption of the brake actuators, so-called self-energizing actuators have been proposed. Early examples of such self-energizing brakes can be found, in U.S. Pat. Nos. 4,653,614, 4,852,699, 4,946,007, 4,974,704, 5,012,901. A self-energizing brake works according to the principle that the braking force amplifies itself. The friction force between the brake linings and the brake disc give rise, with help of a self-energizing mechanism, to increased force against the brake linings and brake disc. This increased force gives, in turn, rise to increased friction force. Hence, it is possible to produce and control large braking forces by applying relatively moderate forces.

The degree of self-energization defines the relation between the applied force and the actual braking force. The self-energization is strongly dependent on the disc/pad friction coefficient. Normally, the variations in the disc/pad friction coefficient are large, and are dependent on, among other factors, the temperature of the disc and/or pad. Variations in disc/pad friction coefficient are even possible within one and the same brake application.

At a specific disc/pad friction coefficient, $\mu_{inf}$, the static reinforcement of the self-energizing mechanism is principally infinity. That means that one can produce and control large brake forces by only applying relatively moderate forces. For disc/pad friction coefficients lower than this specific number, the brake is stable, which means that a pushing force has to be applied to produce brake forces. For disc/pad friction coefficients larger than $\mu_{inf}$, the self-energized brake instead will become unstable, which means that a pulling force has to be applied to hold the brake at a specific brake force or else uncontrolled braking (i.e., lockup) can occur.

Dimensioning the self-energizing mechanism can dimension the properties of the self-energized brake. There are three main ways to dimension the self-energized brake:

(1) Self-releasing brake. The self-energized brake is dimensioned so that $\mu_{inf}$ is greater than every arising disc/pad friction coefficient. The brake will be self-releasing for all possible disc/pad friction coefficients. A pushing force has to be applied to accomplish brake forces.

(2) Self-applying brake. The self-energized brake is dimensioned so that $\mu_{inf}$ is lower than all possible disc/pad friction coefficients. The brake will be self-applying for all possible disc/pad friction coefficients. A pulling force has to be applied to hold the brake at a specific brake force.

(3) Self-releasing or self-applying brake. The self-energized brake is dimensioned so that the disc/pad friction coefficient can be both greater and lower than $\mu_{inf}$, hence it can be active in both the self-releasing and the self-applying domains. (A special case is to dimension the brake so that $\mu_{inf}$ is around the nominal value for the disc/pad friction coefficient. The average degree of self-energization is then maximized under normal conditions.) The brake will be self-releasing when the disc/pad friction coefficients are lower than $\mu_{inf}$, and self-applying when the disc/pad friction coefficients are greater than $\mu_{inf}$.

In cases (2) and (3) above, control based on feedback is critically necessary to stabilize the brake. Otherwise the self-energized brake may become unstable, resulting in uncontrollable braking (i.e., lockup). One alternative is to pull back the brake (without feedback) when sensors normally used for the feedback are detected to be not functioning properly. However, in this case, it is no longer possible to maintain any brake functionality. Further, the brake actuator reinforcement varies extensively when the disc/pad friction coefficient changes. Without control, the variations in brake force would be extensive. It is also necessary to achieve the correct commanded torque/force on all brakes on each axle of the vehicle (unless it is specifically desired that they not be the same, for example during ABS). This is important so that the brake torque/force will not become different on the different wheels at the same commanded brake torque/force.

U.S. Pat. No. 6,318,513 discloses an electromechanical brake which includes an arrangement which brings about self-energization of the actuation force generated by the electric actuator. The brake also includes a device for comparing a setpoint value of a frictional force with the actual value of the frictional force, which device, in the event of a deviation of the actual value from the setpoint value, drives the electric actuator to correspondingly increase or reduce the generated actuation force, and thus approximates the actual value to the setpoint value of the frictional force. However, controlling the electric actuator based upon feedback indicative of the frictional force is disadvantageous for a number of reasons.

One such disadvantage of this configuration becomes apparent particularly when a disc has a thickness that varies during a revolution, which is a quite normal case. This leads to a varying measured clamp or frictional force with a frequency proportional to the wheel rotation speed and the amplitude directly proportional to the brake actuator stiffness. A direct clamp or frictional force feedback would try to compensate for the force error caused by the disc thickness variation. At some vehicle speed this will lead to a high energy consumption compared to an open-loop system as in today's pneumatic system where the disc thickness variations would be uncompensated by the control loop.

Another disadvantage relates to the fact that a typical brake caliper includes a brake actuator working against the disc on one side of the caliper arrangement and with a number of sliding pins to equalize the force between this side of the disc and the other where a fixed pad is located. This is typically known as a "floating caliper" design, and is quite common. Due to ageing and corrosion the sliding pin function may be far from ideal, particularly at the end of the life-cycle of the brake actuator. This may lead to higher static friction of the sliding pins which can cause a slip-stick effect on the equalization of the force between the two sides of the disc. The stick-slip effect may lead to an unstable force sensor signal. Experience shows that introducing this type of signal in a feedback loop may cause problems in the control loop, especially when working at the optimum degree of self-energization.

A further disadvantage relates to the fact that when controlling the self-energized brake actuator with a disc/pad friction coefficient close to the friction coefficient when the static reinforcement is infinity, $\mu_{inf}$, the backlash in the mechanical transmission may be taken into account in control calculations. In the mechanical link between the controlling force/torque from the motor to the clamping force of the pad/disc it is difficult and costly to totally eliminate the backlash in the mechanical transmission. The characteristics of the self-energized brake actuator in the infinite reinforcement region combined with a backlash in the mechanical transmission in the control loop will reduce the performance of the control loop, and it will increase the dissipated energy from responding to disturbances resulting from the backlash. In order to use the full advantage of the self-energization principle, it is important to use a control strategy that allow a fast and energy efficient way to control the brake actuator also in the infinite reinforcement region. As such, taking the backlash in the mechanical transmission into account in the control calculations is undesirable.

What is desired, therefore, is a system for controlling application of an electronically controlled brake which is well-suited for controlling the application of an electromechanical brake with self-energizing characteristics, which facilitates the stability of a self-energizing brake for all possible disc/pad friction coefficients, which achieves the correct commanded torque/force on all brakes on the vehicle, which relies on sensor feedback to control application of the brake, which relies on sensor feedback indicative of other than the frictional force between the disc and pad, clamping force of the caliper or brake torque, which is not substantially deleteriously affected by a disc which has a thickness that varies during a revolution, which is not substantially deleteriously affected by ageing and corrosion of the sliding pins in a floating caliper design, and which does not take into account backlash in the mechanical transmission in control calculations.

SUMMARY OF THE INVENTION

Accordingly, it is an object of the present invention to provide a system for controlling application of an electronically controlled brake which is well-suited for controlling the application of an electromechanical brake with self-energizing characteristics.

Another object of the present invention is to provide a system for controlling application of an electronically controlled brake having the above characteristics and which facilitates the stability of a self-energizing brake for all possible disc/pad friction coefficients.

A further object of the present invention is to provide a system for controlling application of an electronically controlled brake having the above characteristics and which achieves the correct commanded torque/force on all brakes on the vehicle.

Still another object of the present invention is to provide a system for controlling application of an electronically controlled brake having the above characteristics and which relies on sensor feedback to control application of the brake.

Yet a further object of the present invention is to provide a system for controlling application of an electronically controlled brake having the above characteristics and which relies on sensor feedback indicative of other than the frictional force between the disc and pad, clamping force of the caliper or brake torque.

Still a further object of the present invention is to provide a system for controlling application of an electronically controlled brake having the above characteristics and which is not substantially deleteriously affected by a disc which has a thickness that varies during a revolution.

Still yet another object of the present invention is to provide a system for controlling application of an electronically controlled brake having the above characteristics and which is not substantially deleteriously affected by ageing and corrosion of the sliding pins in a floating caliper design.

Yet still a further object of the present invention is to provide a system for controlling application of an electronically controlled brake having the above characteristics and which does not take into account backlash in the mechanical transmission in control calculations.

These and other objects of the present invention are achieved in one embodiment of the present invention by provision of a vehicle brake system which includes a brake actuator, a brake controller operative to control the brake actuator, and at least one position sensor which senses a current position of at least one moveable brake component and provides a current position signal indicative of the current position of the at least one moveable brake component to the brake controller. The brake controller is operative to cause actuation of the brake actuator based at least in part upon a position indicative command received by the brake controller indicative of a commanded position of the at least one moveable brake component and at least in part based upon the current position signal.

In some embodiments, the brake actuator comprises a self-energizing brake actuator. In some embodiments, the brake actuator comprises an electromechanical brake actuator, actuation of which is at least partially achieved employing an electric motor. In certain of these embodiments, the at least one moveable brake component comprises an output shaft of the electric motor. In certain of these embodiments, the output shaft is rotatably moveable, the current position signal is indicative of the current rotational position of the output shaft, and the position indicative command is indicative of a commanded rotational position of the output shaft.

In some embodiments, the at least one moveable brake component comprises at least one of a brake pad and a brake pad carrier. In certain of these embodiments, the at least one of a brake pad and a brake pad carrier is axially moveable, the current position signal is indicative of the current axial position of the at least one of a brake pad and a brake pad carrier, and the position indicative command is indicative of a commanded axial position of the at least of a brake pad and a brake pad carrier.

In some embodiments, the system further includes a command converter for converting a primary command into the position indicative command. In certain of these embodiments, the primary command comprises at least one of a commanded brake torque, a commanded friction force and a commanded clamping force. In some embodiments, the command converter employs at least one of an effective disc brake radius parameter, a pad/disc coefficient of friction parameter, a brake elasticity parameter, and a slack position parameter in order to convert the primary command into the position indicative command.

In some embodiments, the system further includes a parameter estimator for estimating, based upon sensor input, at least one parameter used by the command converter to convert the primary command into the position indicative command, and for supplying the estimated parameter to the command converter. In certain of these embodiments, the at least one parameter comprises at least one of an effective disc brake radius parameter, a pad/disc coefficient of friction parameter, a brake elasticity parameter, and a slack position parameter. In certain embodiments, the sensor input is indicative of at least one of the following: a clamping force, a friction force, a brake torque, the current position of the at least one moveable brake component, a velocity of a brake disc, an acceleration of a brake disc, a motor current, a motor voltage and a motor torque.

According to another embodiment of the present invention, a vehicle brake system includes an electromechanical self-energizing brake actuator, actuation of which is at least partially achieved employing an electric motor, a brake controller operative to control the brake actuator, at least one position sensor which senses a current position of at least one moveable brake component and provides a current position signal indicative of the current position of the at least one moveable brake component to the brake controller, a command converter for converting a primary command into a position indicative command indicative of a commanded position of the at least one moveable brake component and providing the position indicative command to the brake controller, and a parameter estimator for estimating, based upon sensor input, at least one parameter used by the command converter to convert the primary command into the position indicative command, and for supplying the estimated parameter to the command converter. The brake controller is operative to cause actuation of the brake actuator based at least in part upon the position indicative command received by the brake controller and at least in part based upon the current position signal.

In some embodiments, the at least one moveable brake component comprises an output shaft of the electric motor. In certain of these embodiments, the output shaft is rotatably moveable, the current position signal is indicative of the current rotational position of the output shaft, and the position indicative command is indicative of a commanded rotational position of the output shaft. In some embodiments, the at least one moveable brake component comprises at least one of a brake pad and a brake pad carrier. In certain of these embodiments, the at least one of a brake pad and a brake pad carrier is axially moveable, the current position signal is indicative of the current axial position of the at least of a brake pad and a brake pad carrier, and the position indicative command is indicative of a commanded axial position of the at least of a brake pad and a brake pad carrier.

In some embodiments, the primary command comprises at least one of a commanded brake torque, a commanded friction force and a commanded clamping force. In certain of these embodiments, the command converter employs at least one of an effective disc brake radius parameter, a pad/disc coefficient of friction parameter, a brake elasticity parameter, and a slack position parameter in order to convert the primary command into the position indicative command. In some embodiments, the at least one parameter comprises at least one of an effective disc brake radius parameter, a pad/disc coefficient of friction parameter, a brake elasticity parameter, and a slack position parameter. In certain of these embodiments, the sensor input is indicative of at least one of the following: a clamping force, a friction force, a brake torque, the current position of the at least one moveable brake component, a velocity of a brake disc, an acceleration of a brake disc, a current of the motor, a voltage of the motor and a torque of the motor.

In another respect, the present invention relates to a method of controlling a vehicle brake including the steps of receiving a current position signal indicative of a current position of at least one moveable brake component, receiving a position indicative command indicative of a commanded position of the at least one moveable brake component, and causing actuation of a brake actuator based at least in part upon the position indicative command and at least in part based upon the current position signal.

In some embodiments, the brake actuator comprises a self-energizing brake actuator. In some embodiments, the brake actuator comprises an electromechanical brake actuator, actuation of which is at least partially achieved employing an electric motor. In certain of these embodiments, the at least one moveable brake component comprises an output shaft of the electric motor. In some embodiments, the output shaft is rotatably moveable, the current position signal is indicative of the current rotational position of the output shaft, and the position indicative command is indicative of a commanded rotational position of the output shaft.

In some embodiments, the at least one moveable brake component comprises at least one of a brake pad and a brake pad carrier. In certain of these embodiments, the at least one of a brake pad and a brake pad carrier is axially moveable, the current position signal is indicative of the current axial position of the at least of a brake pad and a brake pad carrier, and the position indicative command is indicative of a commanded axial position of the at least of a brake pad and a brake pad carrier.

In some embodiments, the method further includes the step of converting a primary command into the position indicative command. In certain of these embodiments, the primary command comprises at least one of a commanded brake torque, a commanded friction force and a commanded clamping force. In some embodiments, the converting step employs at least one of an effective disc brake radius parameter, a pad/disc coefficient of friction parameter, a brake elasticity parameter, and a slack position parameter in order to convert the primary command into the position indicative command.

In some embodiments, the method further includes the step of estimating, based upon sensor input, at least one parameter used during the converting step to convert the primary command into the position indicative command. In certain of these embodiments, the at least one parameter comprises at least one of an effective disc brake radius parameter, a pad/disc coefficient of friction parameter, a brake elasticity parameter, and a slack position parameter. In some embodiments, the sensor input is indicative of at least one of the following: a clamping force, a friction force, a brake torque, the current position of the at least one moveable brake component, a velocity of a brake disc, an acceleration of a brake disc, a motor current, a motor voltage and a motor torque.

In a further embodiment of the present invention, a method of controlling a vehicle brake includes the steps of receiving a primary command, converting the primary command into a position indicative command indicative of a commanded position of at least one moveable brake component, estimating, based upon sensor input, at least one parameter used during the converting step to convert the primary command into the position indicative command, receiving a current position signal indicative of a current position of the at least one moveable brake component, and causing actuation of a self-energizing brake actuator based at least in part upon the position indicative command and at least in part based upon the current position signal.

In some embodiments, the brake actuator comprises an electromechanical brake actuator, actuation of which is at least partially achieved employing an electric motor. In certain of these embodiments, the at least one moveable brake component comprises an output shaft of the electric motor. In some embodiments, the output shaft is rotatably moveable, the current position signal is indicative of the current rotational position of the output shaft, and the position indicative command is indicative of a commanded rotational position of the output shaft.

In some embodiments, the at least one moveable brake component comprises at least one of a brake pad and a brake pad carrier. In certain of these embodiments, the at least one of a brake pad and a brake pad carrier is axially moveable, the current position signal is indicative of the current axial position of the at least of a brake pad and a brake pad carrier, and the position indicative command is indicative of a commanded axial position of the at least of a brake pad and a brake pad carrier.

In some embodiments, the primary command comprises at least one of a commanded brake torque, a commanded friction force and a commanded clamping force. In certain embodiments, the converting step employs at least one of an effective disc brake radius parameter, a pad/disc coefficient of friction parameter, a brake elasticity parameter, and a slack position parameter in order to convert the primary command into the position indicative command. In some embodiments, the at least one parameter comprises at least one of an effective disc brake radius parameter, a pad/disc coefficient of friction parameter, a brake elasticity parameter, and a slack position parameter. In some embodiments, the sensor input is indicative of at least one of the following: a clamping force, a friction force, a brake torque, the current position of the at least one moveable brake component, a velocity of a brake disc, an acceleration of a brake disc, a motor current, a motor voltage and a motor torque.

The invention and its particular features and advantages will become more apparent from the following detailed description considered with reference to the accompanying drawings.

DETAILED DESCRIPTION OF AN EMBODIMENT OF THE INVENTION

Figure 1:
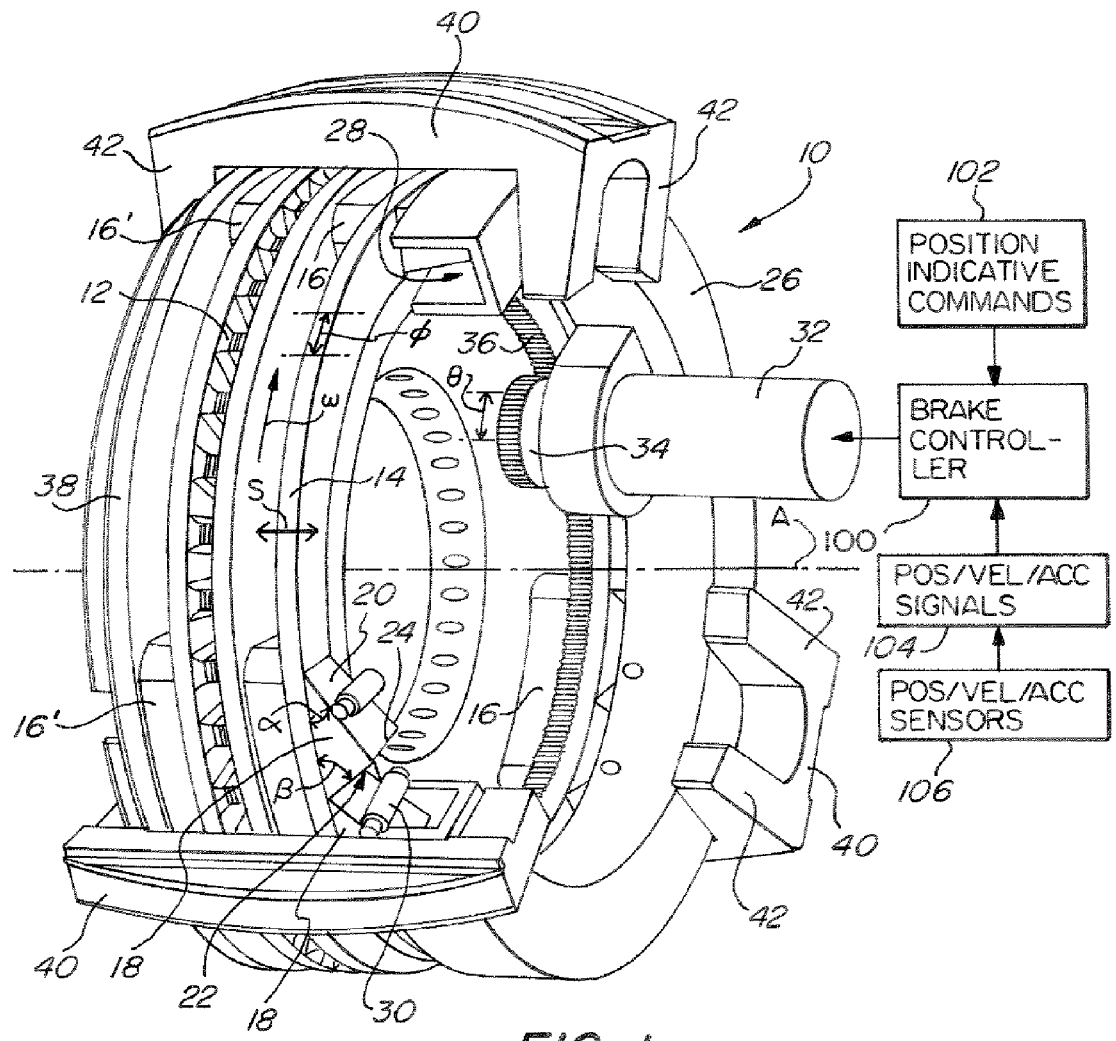
FIG. 1 is a schematic view of one embodiment of a brake system incorporating a system for controlling the application of a brake of a vehicle in accordance with the present invention.

Referring first to FIG. 1, a disc brake 10 with a brake disc 12 which can rotate about an axis A and has internal venting is shown. A first carrier ring 14 is arranged an axial distance from the brake disc 12, parallel to the disc and coaxial with the axis A, there being mounted on that side of the carrier ring which faces the brake disc 12 a plurality of friction elements 16 which can be applied, in a manner explained in more detail below, against the brake disc 12 in order to generate the frictional force which is necessary to brake the brake disc 12. On the opposite side of the first carrier ring 14, facing away from the brake disc 12, a series of wedges 18 are fixedly attached, each of which defines a first face 20 with an angle of inclination a and a second face 22 with an angle of inclination β. Both faces 20, 22 of the first carrier ring 14 extend directly adjacently to one another, essentially in the circumferential direction of the carrier ring 14. In a modified embodiment (not illustrated here), the two faces 20, 22 do not abut one another at a common edge 24, as illustrated in FIG. 1, but instead have between them a section which extends parallel to the carrier ring 14.

As shown in FIG. 1, the two faces 20, 22 are inclined oppositely to one another, the angle of inclination β of the second face 22 being significantly greater than the angle of inclination α of the first face 20. The wedges 18, of which, for the sake of better clarity, only some are illustrated in FIG. 1, follow one another directly, viewed in the circumferential direction of the carrier ring 14, so that the total axially outer face of the first carrier ring 14 is covered with wedges 18. However, in other embodiments, which are not illustrated here, there may be a certain distance between two successive wedges 18 in the circumferential direction, and likewise the entire axially outer face of the carrier ring 14 does not need to be covered by wedges 18, but instead the wedges 18 may be arranged, for example, in groups, there being a relatively large distance between two groups of wedges which follow one another in the circumferential direction. The wedges 18 may be formed in one piece with the first carrier ring 14, but they may also be produced as separate parts and then fixedly connected to the carrier ring 14.

Arranged axially outside the first carrier ring 14 is an annular bearing carrier 26 with an approximately U-shaped cross-section which defines an annular cavity 28 which is open towards the carrier ring 14 and into which the wedges 18 project. A number of bearings 30, which corresponds to the number of wedges 18 and of which only two are illustrated in FIG. 1, are rotatably mounted in this annular cavity 28. The axes of rotation of the bearings 30 which are provided to interact with the wedges 18 are aligned perpendicularly with respect to the axis A. In the exemplary embodiment illustrated in FIG. 1, each bearing 30 is formed by a sleeve which is rotatably mounted on an axis which is arranged fixed in terms of rotation in the bearing carrier 26.

An electric motor 32 is fastened on the radially inner circumferential face of the bearing carrier 26, serves as an electric actuator for the disc brake 10 and has an output pinion 34 which is in engagement with toothing 36 formed on the radially inner circumference of the first carrier ring 14. If necessary, a gear mechanism (not illustrated) may be arranged between the electric motor 32 and the output pinion 34.

On the side of the brake disc 12 lying opposite the first carrier ring 14 there is arranged, at an axial distance therefrom, a second carrier ring 38, likewise parallel to the brake disc 12 and coaxial with the axis A. This second carrier ring 38 is provided with friction elements 16' on its side facing the brake disc 12, which elements are mounted on the second carrier ring 38 at points which correspond at least essentially to the friction elements 16 and which also bear against the brake disc 12 during the braking process.

Arranged in a radially outer region of the disc brake 10 are a plurality of saddles 40 (three in this case) which engage over the bearing carrier 26, the first carrier ring 14, the brake disc 12 and the second carrier ring 38, and by way of radially inwardly projecting arms 42 are supported, on the one hand, on the axially outer end face of the bearing carrier 26 and, on the other hand, on the axially outer end face of the second carrier ring 38 or an element connected thereto.

The function of the illustrated disc brake 10 will now be explained, it being assumed that the disc brake 12 rotates in the direction of the arrow ω. This direction of rotation corresponds to forward travel in a disc brake 10 installed in a vehicle. In order to initiate a braking operation, the electric motor 32 is energized, and subsequently drives the output pinion 34 through an angle θ (which represents the change in the angular motor position) in such a way that the first carrier ring 14 rotates through an angle φ in the direction of rotation ω with respect to the bearing carrier 26 which is fixed in terms of rotation. As a result, the first faces 20 of the wedges 18 run up onto the associated bearings 30, causing the first carrier ring 14 to be displaced axially with respect to the brake disc 12, so that the friction elements 16 come to bear against the brake disc 12. The amount s of the axial displacement of the carrier ring 14 (and thus of the friction elements 16) is determined according to the formula:

$$s=\phi/(2\pi*P)$$

φ being the angle of rotation and P being the inclination of the first face 20 which results from the angle of inclination α.

After the friction elements 16 have been applied to the brake disc 12, the resulting reaction force also brings about an axial displacement of the second carrier ring 38 with respect to the brake disc 12 via the friction elements 16, the first carrier ring 14, the bearing carrier 26 and the saddles 40, with the result that the friction elements 16' are likewise applied to the brake disc 12 (floating caliper principle) virtually without delay. The wedges 18 which interact with the bearings 30 constitute a self-energization arrangement, i.e. the activation force which is applied to the disc brake 10 by the electric motor 32 via the output pinion 34 is automatically amplified without further forces to be applied from the outside.

In order to terminate a braking operation which has been initiated, the electric motor 32 is driven in such a way that the output pinion 34 rotates counter to the direction of travel during the activation, with the result that the first carrier ring 14 is moved back into its starting position again, i.e. the first faces 20 of the wedges 18 run up against the bearing 30, and the carrier ring 14 moves axially away from the brake disc 12.

So that, for example, a vehicle can also be braked when reversing, the wedges 18 have the second face 22 with the angle of inclination β. The angle of inclination β of these faces 22 can be selected to be significantly greater than the angle of inclination α of the first faces 20, since particularly high frictional forces are usually not required during reversing. Although the angle of inclination β which is greater than the angle of inclination α results in an increased energy requirement of the electric motor 32 when braking occurs during reverse travel, this fact does not have disadvantageous effects when braking occurs during reversing because normally only a low braking force is necessary.

Therefore, if the brake disc 12 rotates counter to the arrow ω (reverse travel), it being possible to detect the change in the direction of rotation, the first carrier ring 14 is rotated with the aid of the electric motor 32 to such an extent that the second faces 22 run up onto the bearing 30. The braking process then proceeds as described above.

As an alternative, it is also possible to carry out the braking operation during reverse travel by means of the first faces 20. For this purpose, however, the electric motor 32 must have sufficient force and/or torque reserves (in particular in the case of a wedge arrangement under compression, i.e. with a large angle of inclination α), since the arrangement of wedges 18 and bearings 30 then acts in a self-deenergizing fashion, so that the electric motor 22 must completely apply the necessary frictional force itself.

Figure 2:
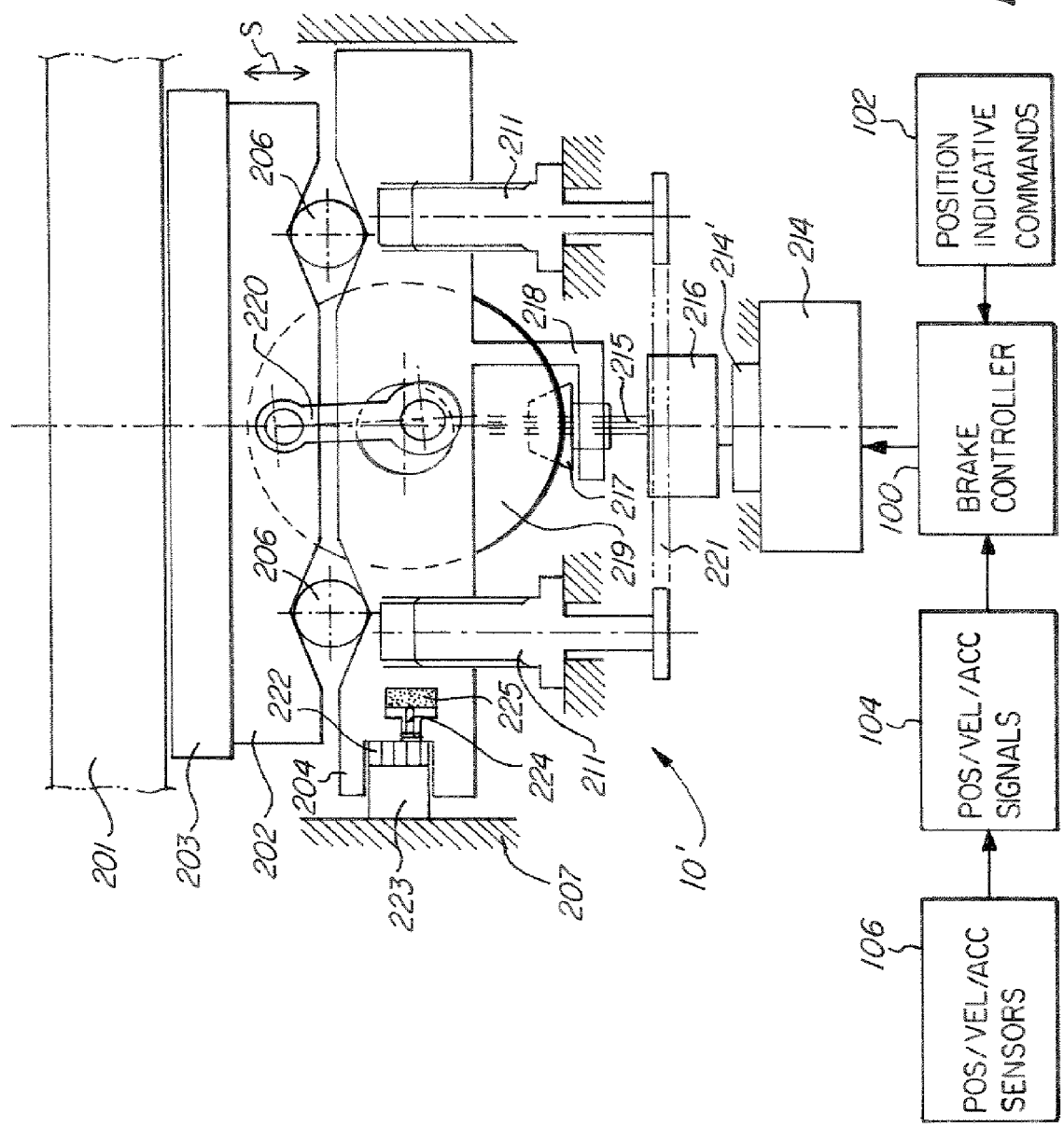
FIG. 2 is a schematic view of another embodiment of a brake system incorporating a system for controlling the application of a brake of a vehicle in accordance with the present invention.
Figure 3:
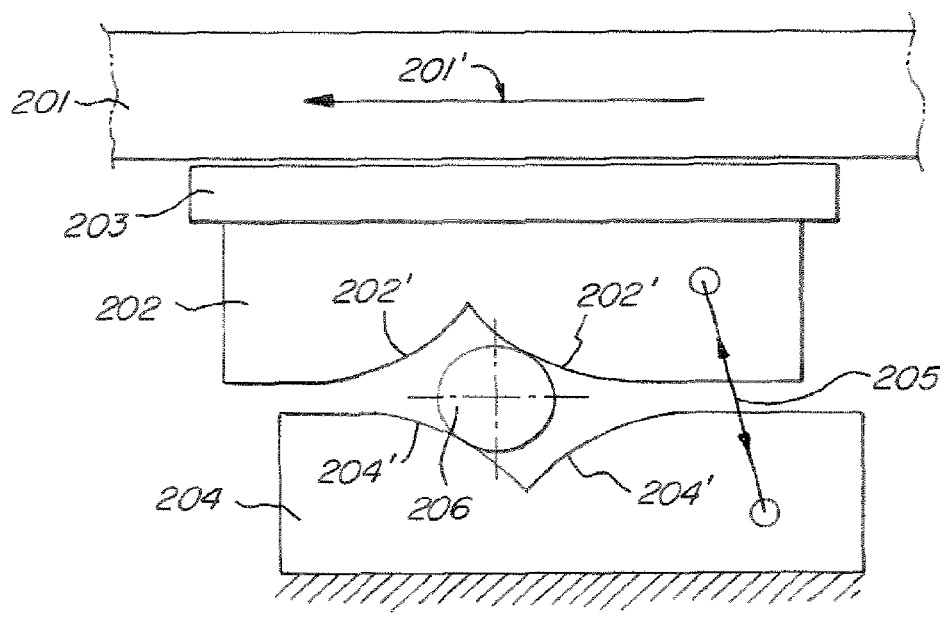
FIG. 3 is a schematic view illustrating in simplified terms the principles behind the operation of the brake system of FIG. 2.

Referring now to FIG. 2, another embodiment of a brake system 10' suitable for use with the present invention is shown. A simplified schematic of the principle behind system 10' is shown in FIG. 3. As shown in FIG. 3, a brake disc 201 is rotating in the direction of an arrow 201'. A ramp plate 202 is provided with a brake pad 203 for braking engagement with the brake disc 201 at will. The ramp plate 202 is movably connected to a ramp bridge 204, which for the purpose of this simple explanation can be regarded as fixed, by a connecting means 205, here illustrated as a line.

At their surfaces facing each other, the ramp plate 202 and the ramp bridge 204 are provided with curved or straight ramps 202' and 204', respectively. A roller 206 is freely rotatable between the ramps 202' and 204'. In a rest position (or a position for a non-applied brake) the unit comprising the ramp plate 202 (with its brake pad 203), the roller 206 and the ramp bridge 204 is held with the brake pad 203 at a small distance from the rotating brake disc 201 and with the roller 206 in the "bottoms" of the ramps 202' and 204'.

For brake application, a control force which is substantially transverse to the brake disc 201 (or in other words substantially axial) is applied on the ramp plate 202, in the shown case through the connecting means 205 as indicated by its upper arrow, until contact between the brake pad 203 and the disc 201 is established. By means of the friction force, the ramp plate 202 is transferred to the left in the drawing, so that the roller 206 rolls up the relevant ramps 202' and 204' and an application force is accomplished without applying any external brake force besides the control force. In other words the brake has a self-energizing effect.

The application force may be controlled by the control force, which can be positive or negative. This is indicated by the provision of also a lower arrow on the connecting means 205, but is not further illustrated and described in connection with FIG. 3. If the brake disc 201 rotates in the opposite direction, the arrangement will function in a similar way due to the provision of the respective double ramps 202' and 204'. In the shown case the ramps 202' and 204' are curved, but they can alternatively be straight. By having a certain curvature of the ramps, a desired brake application characteristic can be obtained.

Referring now specifically to FIG. 2, the ramp bridge 204 of brake 10' is connected to the indicated caliper by means of two adjustment screws 211 in two threaded bores in the ramp bridge 204. Two rollers 206 are arranged between ramps 202' and 204' on the ramp plate 202 and the ramp bridge 204, respectively. Although it is not shown in FIG. 2 or FIG. 3, it may be advantageous for obtaining full control and a completely synchronous movement of the rollers 206 (irrespective of their actual number) to provide a common roller cage for the rollers 206, especially for curved ramps 202' and 204'.

An electric motor 214 can rotate a motor rod 215 in either direction (as indicated by angle of rotation θ) over a rotational speed reducing gear box 216. A bevel gear 217 supported by an arm 218 from the ramp bridge 204 can be rotated by the rod 215 but is axially movable thereon by a splined engagement. The bevel gear 217 is in driving gear engagement with a bevel gear disc 219 rotationally supported by the ramp bridge 204. Eccentrically connected to the bevel gear disc 219 is a crank rod 220 rotationally connected to the ramp plate 202.

By turning the bevel gear disc 219 in either direction by means of the bevel gear 217 from the motor 214 through the gear box 216, the axial position s of the ramp plate 202 in relation to the ramp bridge 204 can be set. In this case the control force is transmitted by the crank rod 220. When a friction engagement between the brake pad 203 and the brake disc 201 has been established, an application force amplification will be accomplished by the rollers 206 climbing their ramps 202' and 204' (thereby also causing a change in the axial position s of the ramp plate 202 in relation to the ramp bridge 204) in response to the tangential movement of the ramp plate 202 caused by the friction engagement with the brake disc 201. The application force may be accurately controlled by rotating the motor 214 in either direction.

The adjustment screws 211 have the purpose of adjusting the position of the ramp bridge 204 in relation to the wear of the brake pad 203 (and a corresponding brake pad on the opposite side of the brake disc 201). The synchronous rotation of the adjustment screws 211 is performed from the gear box 216 by a chain 221 in a way not further described.

In the force transmission from the motor 214 there may be provided an active or passive brake means 214' for the purpose of preventing the motor 214 from consuming current, when there is no command from the driver of the vehicle or the control system of the brake to rotate the motor in any direction. The brake means 214' accordingly has the function to keep the outgoing motor shaft non-rotatable, when the motor 214 is not energized to rotate in either of its two rotational directions.

As discussed above, control based on feedback is critically necessary to stabilize the brake 10, 10'. Otherwise the self-energized brake 10, 10' may become unstable, resulting in uncontrollable braking (i.e., lockup). However, also as discussed above, controlling the electric actuator (i.e., motor 32, 214) based upon feedback indicative of the frictional force between the pads 16, 16', 203 and the disc 12, 201 is disadvantageous for a number of reasons. As such, the brake 10, 10' according to the present invention includes a brake controller 100 which controls actuation of brake 10, 10' via motor 32, 214 based upon the position of one or more brake system components. The pertinent position may, for example, be the rotational position of motor 32, 214 (changes in which are represented by angle θ), the axial position of the brake pads 16, 203, brake pad carrier ring 14 and/or ramp plate 202 (changes in which are represented by dimension s), the rotational position of brake pad carrier ring 14 (changes in which are represented by angle φ), or the position (or change in position) of some other brake component. Of course, it should be immediately recognized by one skilled in the art that the control scheme detailed below can be used with substantially any type of brake system, and is not limited to use with the particular brake systems 10, 10' described above. Thus, certain brake systems may include additional displaceable elements other than described above and/or may not include certain of the displaceable elements described above (for example, some brake systems may include brake pad carriers which are not rotationally displaceable). What is important is that brake controller 100 controls actuation of brake 10, 10' based upon the position of one or more brake system components—the particular component whose position is used to control brake 10, 10' is unimportant.

However, as described above, taking the backlash in the mechanical transmission into account in the control calculations is undesirable. As such, the preferred source of the feedback of the position signal is from a mechanical location in the transmission located between the motor 32, 214 and the main source of the backlash. The motor position (e.g., the rotational position of motor 32, 214) is an example of a signal from a preferred mechanical location. This will exclude the backlash from the fast position control loop 110 (described in more detail below). Also with this control strategy it is important to keep the backlash small, as the backlash will be a part of an open loop system (i.e., the remainder of control scheme 108). Hence by using the feedback from the position signal in the control loop, as described above, the problems associated with backlash in the mechanical transmission are avoided. A further implication of this is that it removes restrictions on how to dimension the self-energizing brake. By using the position signal as feedback in the fast position control loop 110, it is possible to dimension the self-energizing brake to take full advantage of the optimal brake reinforcement. It can be dimensioned to operate in both the self-releasing and the self-applying domains. Hence, energy optimal solutions are possible.

Brake controller 100 receives commands 102 indicative of a desired controlled position $Pos^C$ for one or more brake components, and drives motor 32, 214 accordingly in order to achieve the desired position. Signals 104 indicative of the position of one or more system components, the velocity (i.e., rate of change of position over time—d/dt position) of one or more system components and/or the acceleration (i.e., rate of change of velocity over time—d/dt velocity) of one or more system components received from position, velocity and/or acceleration sensors 106 may be used by brake controller 100 to ensure that the motor 32, 214 is driven in order to achieved the desired position of the brake component(s) whose position is being controlled. If velocity and/or acceleration signals are employed, such may be measured directly by velocity and/or acceleration sensors, or may be calculated based upon measured position by position sensors.

Figure 4:
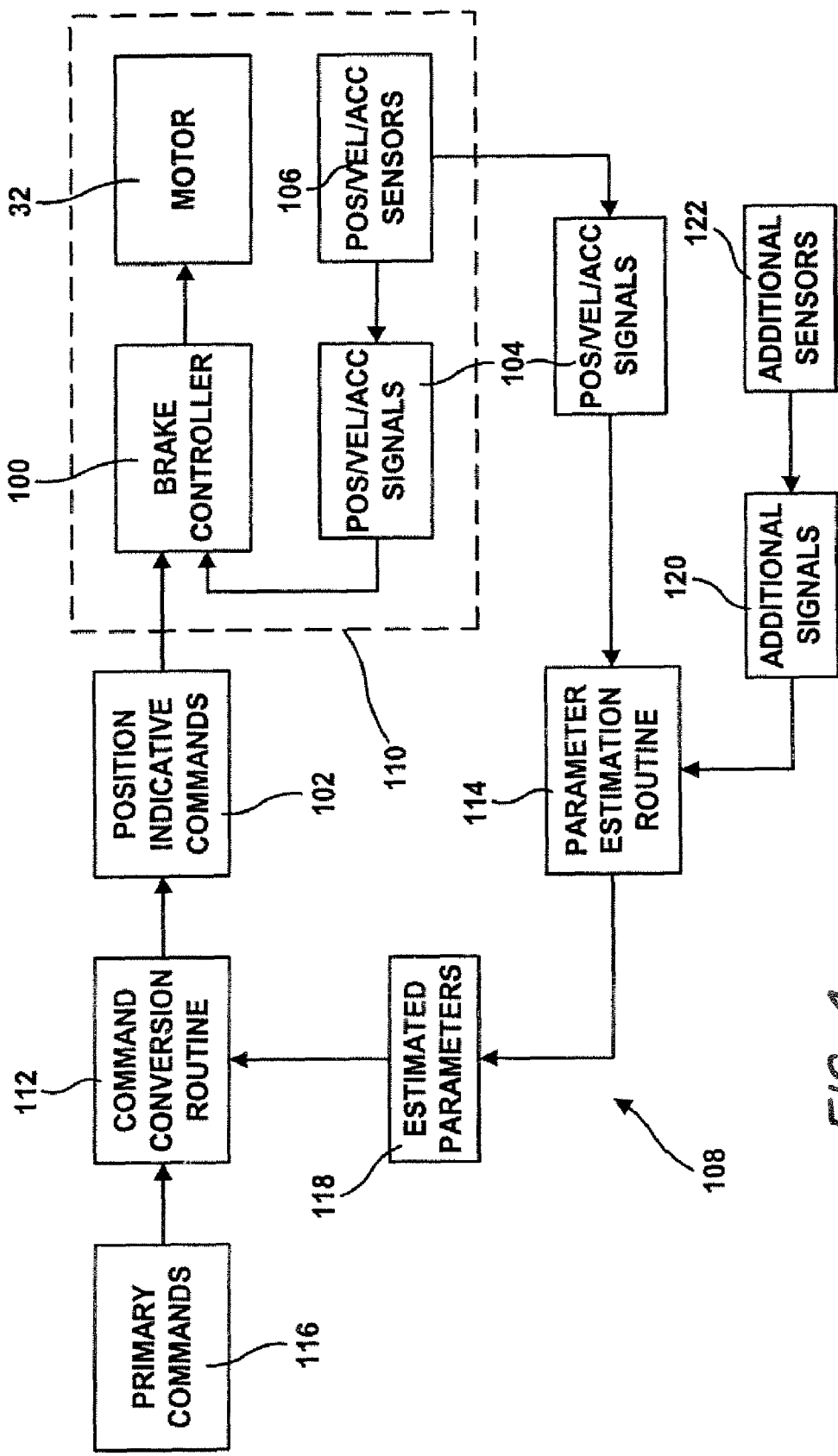
FIG. 4 is a block diagram illustrating in more detail the system for controlling the application of a brake of a vehicle shown in FIGS. 1 and 2.

Referring now to FIG. 4, an embodiment of an overall brake application control scheme 108 in accordance with the present invention is shown. It should be understood that brake controller 100, position, velocity and/or acceleration sensors 106, signals 104 indicative of the position of one or more system components, the velocity (i.e., rate of change of position over time—d/dt position) of one or more system components and/or the acceleration (i.e., rate of change of velocity over time—d/dt velocity) of one or more system components and motor 32, 214 comprise a fast position control loop 110 portion of overall control scheme 108 and function as described above.

In addition to fast inner control loop 110 for controlling the position (e.g. the rotational position of motor 32, 214, the axial position of the brake pads 16, 203, brake pad carrier ring 14 and/or ramp plate 202, the rotational position of brake pad carrier ring 14, or the position or change in position of some other brake component) of the self-energizing electric brake actuator, control scheme 108 also includes a command conversion routine 112 and a parameter estimation routine 114. The command conversion routine 112 receives primary commands 116 (usually in the form of a commanded brake torque $T_B^C$) from an operator input (e.g. a brake pedal) or from vehicle brake system (e.g., a brake control system, an anti-lock braking system, a stability control system, etc.) and converts primary commands 116 into position indicative commands 102 using properties of the brake actuator to perform the signal conversion as more fully described below.

Examples of parameters which may be used by command conversion routine 112 in the signal conversion include the effective disc brake radius $R_{eff}$, the disc/pad friction $\mu$, the brake actuator elasticity $c_E$, and the slack position $Pos_0$. One or more of these parameters may be estimated by parameter estimation routine 114 so that the estimated parameters 118 may adapt to changes in the system. Such estimations may be based on signals 104 indicative of the position of one or more system components and/or the velocity of the disc 12, 201 and/or the vehicle received from position and/or velocity sensors 106, and/or on additional signals 120 indicative of other system conditions received from one or more additional sensors 122 as more fully described below. Since these parameters changes relative slow, the parameter estimation learning works on a slow time-scale. The control scheme 108 thus represents indirect position control of the brake 10, 10'.

Figure 5:
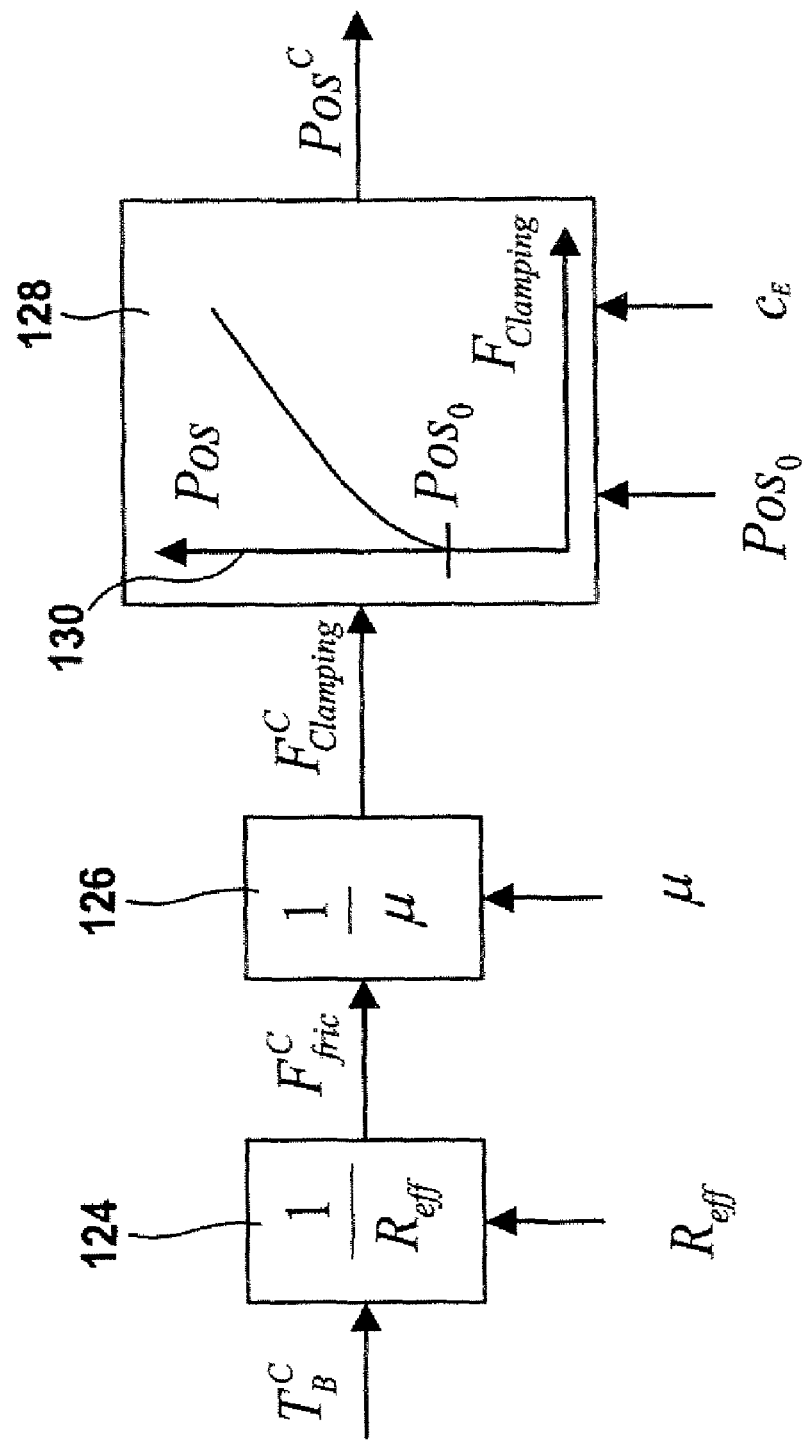
FIG. 5 is a block diagram illustrating in more detail a command conversion routine portion of the system for controlling the application of a brake of a vehicle shown in FIG. 4.

Referring now to FIG. 5, operation of command conversion routine 112 is shown in greater detail. The primary commanded brake torque signal $T_B^C$ is converted to an indirect commanded position signal $Pos^C$. It is also possible to have that primary commands 116 primary area already in the form of commanded friction force $F_{fric}^C$, primary commanded clamping force $F^C_{Clamping}$ or primary commanded position signals $Pos^C$. In these cases only partial conversion or no conversion at all is required.

The physics of disc braking is employed by command conversion routine 112 to convert the primary commanded brake torque signal $T_B^C$ to a commanded position signal $Pos^C$. The commanded friction force $F_{fric}^C$ is calculated at block 124 by dividing the commanded brake torque $T_B^C$ with the effective disc brake radius $R_{eff}$. The commanded clamping force $F^C_{clamping}$ is then calculated at block 126 by dividing the commanded friction force $F_{fric}^C$ by the estimated disc/pad friction coefficient $\mu$. The commanded position signal $Pos^C$ is calculated at block 128 by using the estimated brake pad position/force relationship $Pos=f(F_{Clamping})$ (shown in graph 130). This relationship is in general non-linear. A simplification is to calculate the commanded position signal $Pos^C$ by dividing the commanded clamping force $F_{Calliper}^C$ by the estimated brake elasticity $c_E$ (total elasticity in the brake pad, caliper and transmission), and adding the estimated slack position $Pos_0$.

Figure 6:
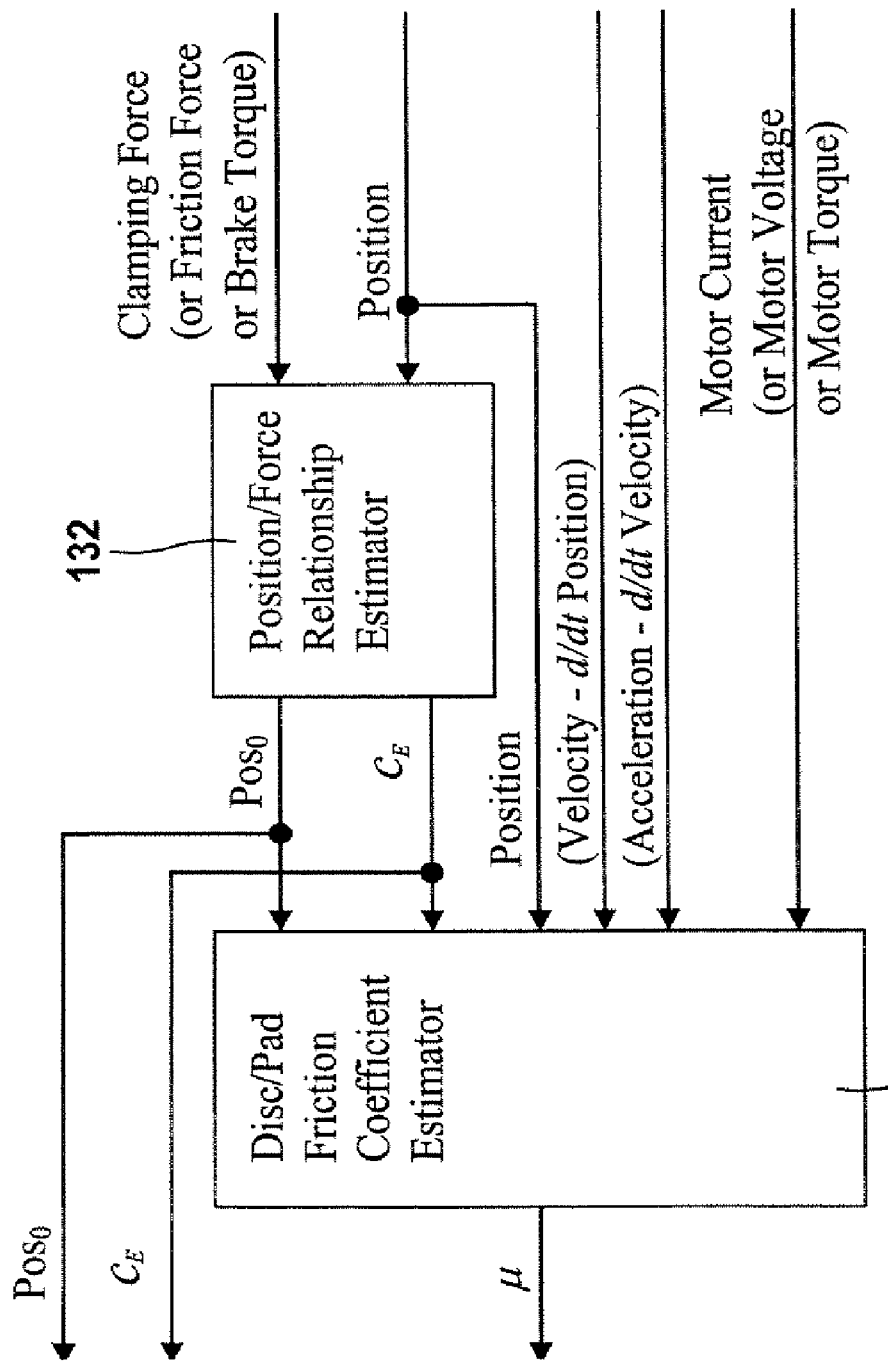
FIG. 6 is a block diagram illustrating in more detail a parameter estimation routine portion of the system for controlling the application of a brake of a vehicle shown in FIG. 4.

Referring now to FIG. 6, operation of parameter estimation routine 114 is shown in greater detail. The parameters needed to perform the command signal conversion are estimated based on sensor signals 104, 120 and models of the brake system 10, 10'. Since the parameters are changing slowly with time, it is acceptable that the parameter estimation routine 114 run with a relatively slow learning rate. The position/clamping force relationship (i.e., the parameters of brake elasticity $c_E$ and slack position $Pos_0$) is estimated at block 132 using the a clamping force signal (or optionally a friction force signal or a brake torque signal) received from sensors 122 and the position signal 104 received from sensors 106. A number of known brake system parameters are used in the estimation, as is known in the art. The estimation may be achieved using known formulae and/or general functional relationships. The brake elasticity $c_E$ and slack position $Pos_0$ parameters are sent to command conversion routine 112 and are used by parameter estimation routine 114 at block 134 in order to estimate the friction coefficient $\mu$. Also used by parameter estimation routine 114 at block 134 in order to estimate the friction coefficient $\mu$ are a motor current signal (or optionally a motor voltage or motor torque signal) received from sensors 122 and the position signal 104 (or optionally a velocity or acceleration signal) received from sensors 106. A number of known brake system parameters are used in the estimation, as is known in the art. The estimation may be achieved using known formulae and/or general functional relationships. The friction coefficient $\mu$ parameter is sent to command conversion routine 112. It should be noted that the effective disc brake radius $R_{eff}$ parameter may be provided to command conversion routine 112 by parameter estimation routine 114, or because it is substantially constant may be maintained in a memory at command conversion routine 112.

The present invention, therefore, provides a system for controlling application of an electronically controlled brake which is well-suited for controlling the application of an electromechanical brake with self-energizing characteristics, which facilitates the stability of a self-energizing brake for all possible disc/pad friction coefficients, which achieves the correct commanded torque/force on all brakes on the vehicle, which relies on sensor feedback to control application of the brake, which relies on sensor feedback indicative of other than the frictional force between the disc and pad, clamping force of the caliper or brake torque, which is not substantially deleteriously affected by a disc which has a thickness that varies during a revolution, which is not substantially deleteriously affected by ageing and corrosion of the sliding pins in a floating caliper design, and which does not take into account backlash in the mechanical transmission in control calculations.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A vehicle brake system comprising:
   a brake actuator;
   a brake controller operative to control said brake actuator;
   at least one position sensor which senses a current position of at least one moveable brake component and provides a current position signal indicative of the current position of the at least one moveable brake component to said brake controller;

wherein said brake controller is operative to cause application of said brake actuator based at least in part upon a comparison of a position indicative command received by said brake controller, said position indicative command indicative of a commanded position to which the at least one moveable brake component is to be moved in order to achieve a demanded level of braking indicated by a commanded brake torque, with the current position signal; and a command converter which converts the commanded brake torque into a commanded friction force by dividing the commanded brake torque with an effective disc brake radius, which converts the commanded friction force into a commanded clamping force by dividing the commanded friction force by a disc/pad friction coefficient, and which converts the commanded clamping force into the position indicative command either: (i) by employing a known relationship between brake pad position versus clamping force, or (ii) by dividing the commanded clamping force by a brake elasticity and adding a slack position.

2. The system of claim 1 wherein said brake actuator comprises a self-energizing brake actuator.

3. The system of claim 1 wherein said brake actuator comprises an electromechanical brake actuator, actuation of which is at least partially achieved employing an electric motor.

4. The system of claim 3 wherein the at least one moveable brake component comprises an output shaft of the electric motor.

5. The system of claim 4 wherein the output shaft is rotatably moveable, wherein the current position signal is indicative of a current rotational position of the output shaft, and wherein the position indicative command is indicative of a commanded rotational position of the output shaft.

6. The system of claim 1 wherein the at least one moveable brake component comprises at least one of a brake pad and a brake pad carrier.

7. The system of claim 6 wherein the at least one of a brake pad and a brake pad carrier is axially moveable, wherein the current position signal is indicative of a current axial position of the at least one of a brake pad and a brake pad carrier, and wherein the position indicative command is indicative of a commanded axial position of the at least one of a brake pad and a brake pad carrier.

8. The system of claim 1 further comprising a parameter estimator for estimating, based upon sensor input, at least one parameter used by the command converter, and for supplying the estimated parameter to the command converter.

9. The system of claim 8 wherein the at least one parameter comprises at least one of an effective disc brake radius parameter, a pad/disc coefficient of friction parameter, a brake elasticity parameter, and a slack position parameter.

10. The system of claim 8 wherein the sensor input is indicative of at least one of the following: a clamping force, a friction force, a brake torque, the current position of the at least one moveable brake component, a velocity of a brake disc, an acceleration of a brake disc, a motor current, a motor voltage and a motor torque.

11. A vehicle brake system comprising:
an electromechanical self-energizing brake actuator, actuation of which is at least partially achieved employing an electric motor;
a brake controller operative to control said brake actuator;
at least one position sensor which senses a current position of at least one moveable brake component and provides a current position signal indicative of the current position of the at least one moveable brake component to said brake controller;
a command converter for determining a position indicative command, said position indicative command indicative of a commanded position to which the at least one moveable brake component is to be moved in order to achieve a demanded level of braking indicated by a commanded brake torque, and providing the position indicative command to said brake controller, wherein said command converter converts the commanded brake torque into a commanded friction force by dividing the commanded brake torque with an effective disc brake radius, converts the commanded friction force into a commanded clamping force by dividing the commanded friction force by a disc/pad friction coefficient, and converts the commanded clamping force into the position indicative command either: (i) by employing a known relationship between brake pad position versus clamping force, or (ii) by dividing the commanded clamping force by a brake elasticity and adding a slack position;
a parameter estimator for estimating, based upon sensor input, at least one parameter used by said command converter, and for supplying the estimated parameter to said command converter; and
wherein said brake controller is operative to cause application of said brake actuator based at least in part upon a comparison of the position indicative command received by said brake controller with the current position signal.

12. The system of claim 11 wherein the at least one moveable brake component comprises an output shaft of the electric motor.

13. The system of claim 12 wherein the output shaft is rotatably moveable, wherein the current position signal is indicative of a current rotational position of the output shaft, and wherein the position indicative command is indicative of a commanded rotational position of the output shaft.

14. The system of claim 11 wherein the at least one moveable brake component comprises at least one of a brake pad and a brake pad carrier.

15. The system of claim 14 wherein the at least one of a brake pad and a brake pad carrier is axially moveable, wherein the current position signal is indicative of a current axial position of the at least one of a brake pad and a brake pad carrier, and wherein the position indicative command is indicative of a commanded axial position of the at least one of a brake pad and a brake pad carrier.

16. The system of claim 11 wherein the at least one parameter comprises at least one of an effective disc brake radius parameter, a pad/disc coefficient of friction parameter, a brake elasticity parameter, and a slack position parameter.

17. The system of claim 16 wherein the sensor input is indicative of at least one of the following: a clamping force, a friction force, a brake torque, the current position of the at least one moveable brake component, a velocity of a brake disc, an acceleration of a brake disc, a current of the motor, a voltage of the motor and a torque of the motor.

18. A method of controlling a vehicle brake, said method comprising the steps of:
receiving a current position signal indicative of a current position of at least one moveable brake component from a position sensor;
receiving an indication of a commanded brake torque indicative of demanded level of braking;

converting the commanded brake torque into a commanded friction force by dividing the commanded brake torque with an effective disc brake radius;

converting the commanded friction force into a commanded clamping force by dividing the commanded friction force by a disc/pad friction coefficient, converting the commanded clamping force into a position indicative command either: (i) by employing a known relationship between brake pad position versus clamping force, or (ii) by dividing the commanded clamping force by a brake elasticity and adding a slack position;

comparing the position indicative command with the current position signal; and causing application of a brake actuator based at least in part upon the comparison between the position indicative command and the current position signal.

19. The method of claim 18 wherein the brake actuator comprises a self-energizing brake actuator.

20. The method of claim 18 wherein the brake actuator comprises an electromechanical brake actuator, actuation of which is at least partially achieved employing an electric motor.

21. The method of claim 20 wherein the at least one moveable brake component comprises an output shaft of the electric motor.

22. The method of claim 21 wherein the output shaft is rotatably moveable, wherein the current position signal is indicative of a current rotational position of the output shaft, and wherein the position indicative command is indicative of a commanded rotational position of the output shaft.

23. The method of claim 18 wherein the at least one moveable brake component comprises at least one of a brake pad and a brake pad carrier.

24. The method of claim 23 wherein the at least one of a brake pad and a brake pad carrier is axially moveable, wherein the current position signal is indicative of a current axial position of the at least one of a brake pad and a brake pad carrier, and wherein the position indicative command is indicative of a commanded axial position of the at least one of a brake pad and a brake pad carrier.

25. The method of claim 18 further comprising the step of estimating, based upon sensor input, at least one parameter used during said converting steps.

26. The method of claim 25 wherein the at least one parameter comprises at least one of an effective disc brake radius parameter, a pad/disc coefficient of friction parameter, a brake elasticity parameter, and a slack position parameter.

27. The method of claim 25 wherein the sensor input is indicative of at least one of the following: a clamping force, a friction force, a brake torque, the current position of the at least one moveable brake component, a velocity of a brake disc, an acceleration of a brake disc, a motor current, a motor voltage and a motor torque.

28. A method of controlling a vehicle brake, said method comprising the steps of:

receiving an indication of a commanded brake torque indicative of a demanded level of braking;

converting the commanded brake torque into a commanded friction force by dividing the commanded brake torque with an effective disc brake radius;

converting the commanded friction force into a commanded clamping force by dividing the commanded friction force by a disc/pad friction coefficient, converting the commanded clamping force into a position indicative command either: (i) by employing a known relationship between brake pad position versus clamping force, or (ii) by dividing the commanded clamping force by a brake elasticity and adding a slack position;

estimating, based upon sensor input, at least one parameter used during said converting steps;

receiving a current position signal indicative of a current position of the at least one moveable brake component from a position sensor;

comparing the position indicative command with the current position signal; and causing application of a self-energizing brake actuator based at least in part upon the comparison between the position indicative command and the current position signal.

29. The method of claim 28 wherein the brake actuator comprises an electromechanical brake actuator, actuation of which is at least partially achieved employing an electric motor.

30. The method of claim 29 wherein the at least one moveable brake component comprises an output shaft of the electric motor.

31. The method of claim 30 wherein the output shaft is rotatably moveable, wherein the current position signal is indicative of a current rotational position of the output shaft, and wherein the position indicative command is indicative of a commanded rotational position of the output shaft.

32. The method of claim 28 wherein the at least one moveable brake component comprises at least one of a brake pad and a brake pad carrier.

33. The method of claim 32 wherein the at least one of a brake pad and a brake pad carrier is axially moveable, wherein the current position signal is indicative of a current axial position of the at least one of a brake pad and a brake pad carrier, and wherein the position indicative command is indicative of a commanded axial position of the at least one of a brake pad and a brake pad carrier.

34. The method of claim 28 wherein the at least one parameter comprises at least one of an effective disc brake radius parameter, a pad/disc coefficient of friction parameter, a brake elasticity parameter, and a slack position parameter.

35. The method of claim 28 wherein the sensor input is indicative of at least one of the following: a clamping force, a friction force, a brake torque, the current position of the at least one moveable brake component, a velocity of a brake disc, an acceleration of a brake disc, a motor current, a motor voltage and a motor torque.

* * * * *